United States Patent [19]

Arnold

[11] 4,345,659

[45] Aug. 24, 1982

[54] AUTOMATIC STEERING MECHANISM FOR SOD PROCESSING MACHINE AND SHOE THEREFOR

[75] Inventor: William T. Arnold, Sutton West, Canada

[73] Assignee: Browwer Turf Equipment Limited, Keswick, Canada

[21] Appl. No.: 168,820

[22] Filed: Jul. 10, 1980

[51] Int. Cl.³ ............................................. B62D 1/26
[52] U.S. Cl. .................................. 180/131; 104/244.1; 172/26; 280/776
[58] Field of Search ............... 180/131, 79; 104/244.1; 172/6, 26, 23; 280/87.2, 776

[56] References Cited

U.S. PATENT DOCUMENTS

| | | | |
|---|---|---|---|
| 1,444,738 | 2/1923 | Funk | 104/244.1 |
| 1,567,853 | 12/1925 | McKee | 180/271 |
| 1,731,220 | 10/1929 | Zubach | 104/244.1 |
| 1,900,525 | 3/1933 | Silver | 104/244.1 |
| 2,925,875 | 2/1960 | Bourdon | 180/131 |
| 3,395,771 | 8/1968 | Moyer et al. | 180/131 |
| 3,402,784 | 9/1968 | Roberson et al. | 180/131 |
| 3,708,029 | 1/1973 | Sedgfield et al. | 180/79 |
| 4,161,143 | 7/1979 | Fasse et al. | 180/131 |
| 4,165,796 | 8/1979 | Petz | 180/131 |

*Primary Examiner*—John A. Pekar
*Attorney, Agent, or Firm*—Rogers, Bereskin & Parr

[57] ABSTRACT

An automatic steering mechanism for a sod harvester, in which a shoe follows the cut edge of a strip of sod. The show has a working edge which slides along the cut sod edge and penetrates slightly into it, to resist the tendency of the shoe to ride up over the cut edge. A ramp on the front of the shoe is also spaced away from the working edge for the same reason. The shoe is mounted on an arm which in one embodiment actuates a pair of automobile points which transmit steering signals to a solenoid hydraulic steering valve. A mechanical connection between the steered wheels and the arm provides feedback. In another embodiment the arm on which the shoe is mounted is mechanically connected to and moves a valve shuttle bracket which operates the hydraulic steering valve. Feedback is provided by a mechanical connection from the steering wheels to a mounting block on which the steering valve is mounted, to move the steering valve bodily in a direction which counteracts the movement of the shuttle.

5 Claims, 16 Drawing Figures

AUTOMATIC STEERING MECHANISM FOR SOD PROCESSING MACHINE AND SHOE THEREFOR

This invention relates to an automatic steering mechanism for a sod processing machine, and to a shoe for use in an automatic steering mechanism.

Sod is commonly harvested by sod harvesters which include an undercutting blade for undercutting a strip of sod, sidecutting blades for cutting the edges of the strip of sod, and a conveyor located behind the blades for conveying the cut sod upwardly to a location where it is processed for shipment. In operation the driver of a sod harvester attempts to steer the vehicle so that the edge of the undercutting blade is in exact alignment at all times with the cut edge of the sod lying in the ground. If the path of the harvester varies from such alignment, either the strip of sod being cut will become too narrow, which makes the sod unfit for sale to customers as standard sod, or else the operator will leave a thin strip of sod remaining in the ground between cut strips. Since operators prefer to err on the side of ensuring that the cut strip of sod is of proper width, it is common to leave strips of sod in the ground of from one to three inches in width. When the total width of the sod strip is only 18 inches, as is common, the strip of sod left in the ground amounts to a substantial percentage of the total amount of sod cut. In addition when the field is being tilled after harvesting, to plant fresh grass seed, the strips of sod remaining in the ground create difficulty in cultivating the field.

It is therefore an object of the present invention to provide an automatic steering mechanism for a sod harvester, so that the harvester will follow the edge of the cut sod in the ground automatically, without depending on the constant skill and attention of the operator. It is a further object of the invention to provide a shoe for following the edge of the cut sod, the shoe being designed so that there is little tendency for the shoe to jump over the cut edge of the sod (which would result in loss of automatic steering for the harvester).

In one of its aspects the invention provides a shoe for an automatic steering mechanism for a sod processing machine, for guiding said machine forwardly along a path of travel parallel to a cut edge of sod in the ground, said shoe having a side member having an elongated horizontal edge portion adapted for sliding movement along and against said cut edge, said edge portion including an elongated inwardly extending protrusion adapted to protrude into said cut edge at a level below the top surface of said sod, so that said edge portion may in use penetrate into said edge of said sod beneath the top surface thereof to resist the tendency of said shoe to rise over said sod, said side member having a front ramp means which slopes upwardly and forwardly so that said side member will rise over obstacles in said path of travel.

In another aspect the invention provides sod harvesting apparatus having wheels for steering said apparatus, a steering mechanism for steering said wheels, hydraulic power means for driving said steering mechanism, and a hydraulic steering circuit connected to said hydraulic power means for operating said hydraulic power means, an automatic steering mechanism for guiding said apparatus along a path of travel parallel to a cut edge of sod in the ground, said mechanism comprising: a shoe adapted to slide along the ground against said cut edge and to follow said edge; a support arm for said shoe, said support arm being mounted on said apparatus; joint means connecting said shoe to said support arm for pitching and yawing movement of said shoe relative to said support arm; sensing means connected to said arm for sensing side to side movement of said arm as said shoe follows said cut edge and for producing a steering signal in response to said side to side movement; valve means in said hydraulic steering circuit for controlling flow to said hydraulic power means; means connected to said valve means and to said sensing means and responsive to said steering signal for operating said valve means to steer said steering wheels for said apparatus to follow the path of said shoe; and feedback means connected to said wheels and coupled to said sensing means and responsive to the steering of said wheels in the direction caused by said steering signal to change the condition of said sensing means in a direction to reduce said steering signal from said sensing means.

Further objects and advantages of the invention will appear from the following description, taken together with the accompanying drawings, in which.

Figure 1:
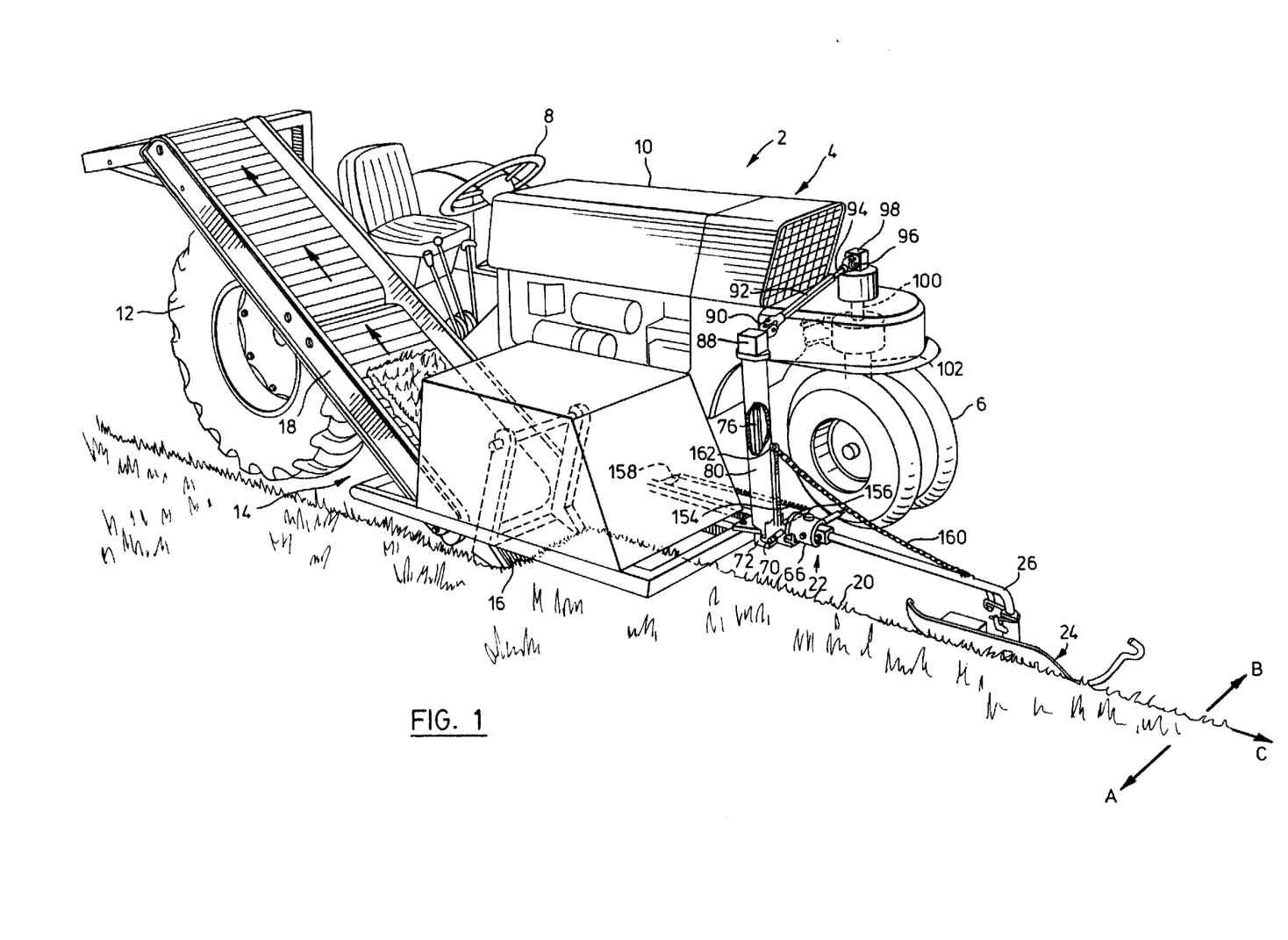
FIG. 1 is a front perspective view of a sod harvester equipped with an automatic steering mechanism according to the invention.
Figures 6, 7:
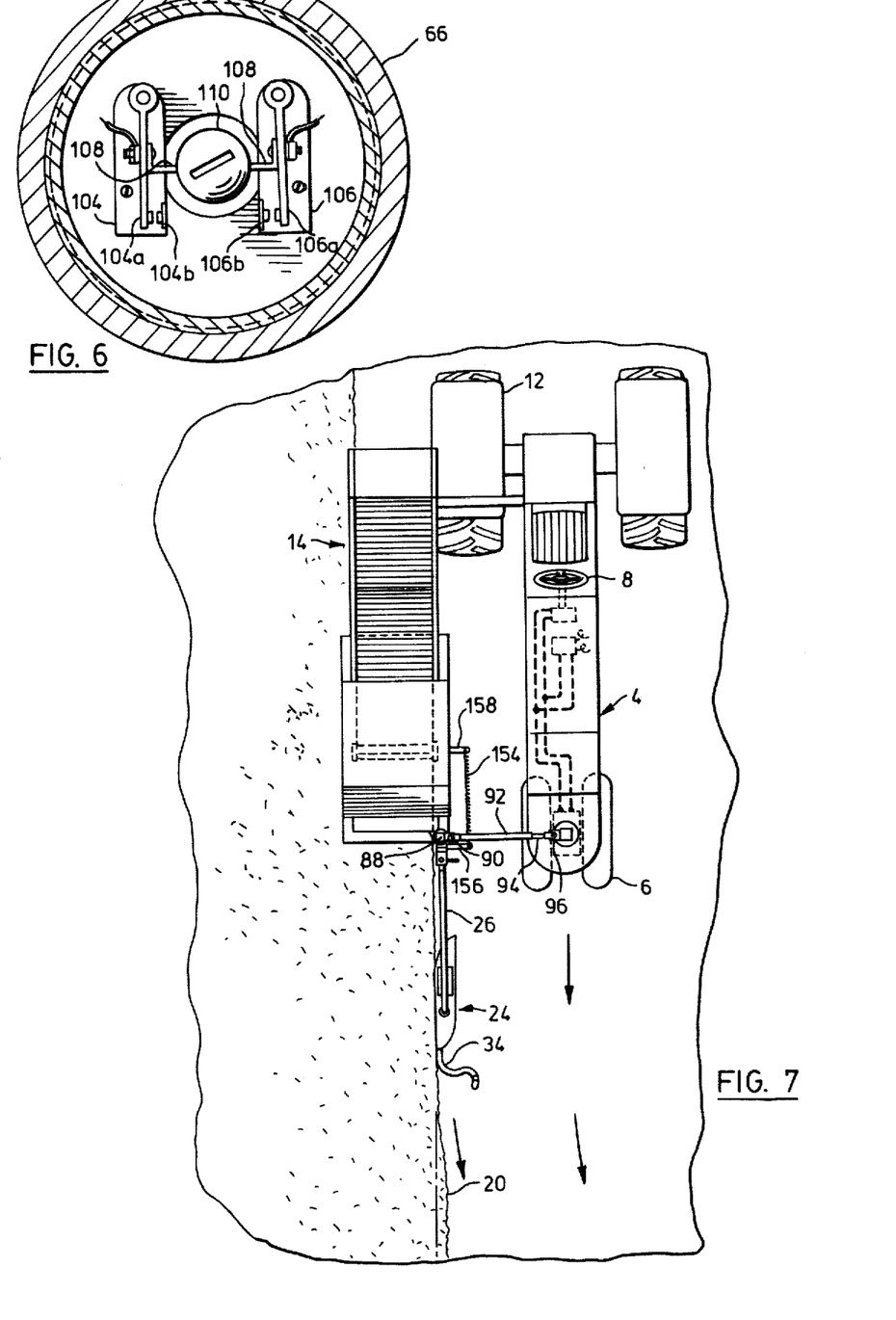
FIG. 6 is a sectional view along lines 6—6 of FIG. 5.
FIG. 7 is a top view of the harvester of FIG. 1.

Reference is first made to FIGS. 1 and 7 which show a typical sod harvester 2 with which the invention may be employed. The harvester 2, which is conventional and which is shown diagrammatically, may be of the kind illustrated in issued U.S. Pat. No. 3,509,944. The harvester 2 includes a tractor 4 having front steered wheels 6 controlled by a steering wheel 8, a body 10, and rear wheels 12. Connected to the side of the tractor is a sod cutter 14 having undercutting and sidecutting blades generally indicated at 16, and a conveyor system 18 to convey cut sod upwardly for processing. The sod cutter blades 16 may be of the kind shown in U.S. Pat. No. 3,509,944. The harvester 2 will normally include mechanism for rolling or slabbing the sod, and may also include mechanism for stacking the sod onto pallets; such mechanism is not shown since it is conventional and does not form part of this invention.

In operation the sod harvester 2 will normally travel along a path of travel which follows the cut edge 20 of sod which lies in the ground. In this description the term "inwardly" will be used to describe a horizontal direction into the sod lying in the ground, as indicated by arrow A. The term "outwardly" will be used to describe a horizontal direction away from the sod remaining to be cut, and is indicated by arrow B. The path of travel of the harvester is indicated by arrow C.

As discussed, it is essential that the operator guide the machine so that the outer edge of the undercutting blade 16 travels in close alignment with the cut edge 20 of the strip of sod in the ground. To enable this to be carried out automatically, an automatic steering mechanism generally indicated at 22 is provided. The steering mechanism 22 includes a shoe 24 mounted on a support arm 26.

Figure 2:
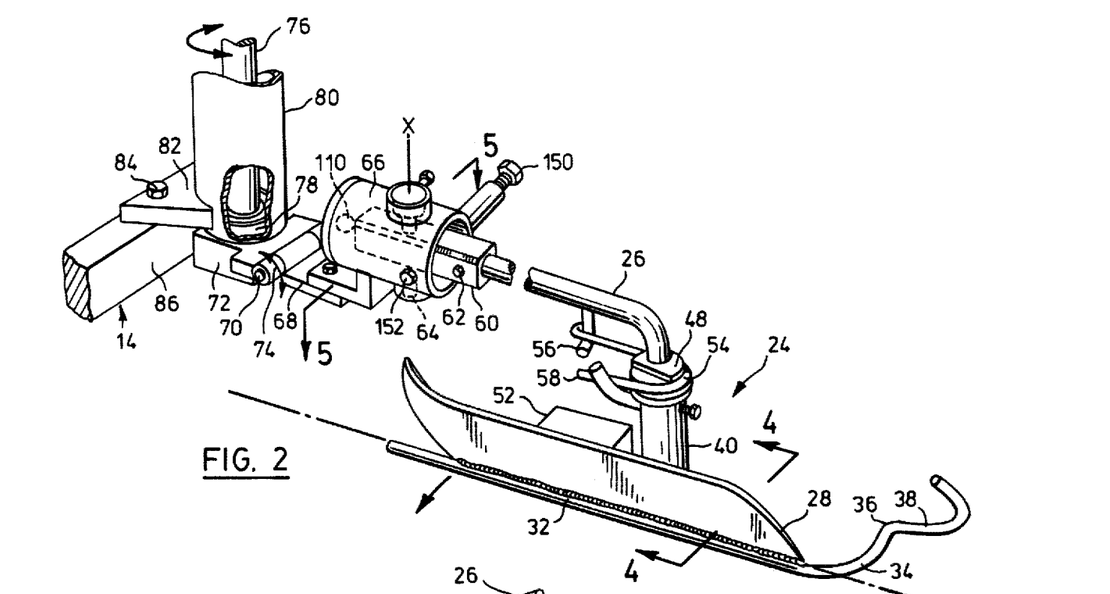
FIG. 2 is a perspective view of a shoe and mounting mechanism for the harvester of FIG. 1.
Figures 3, 4, 4A, 5:
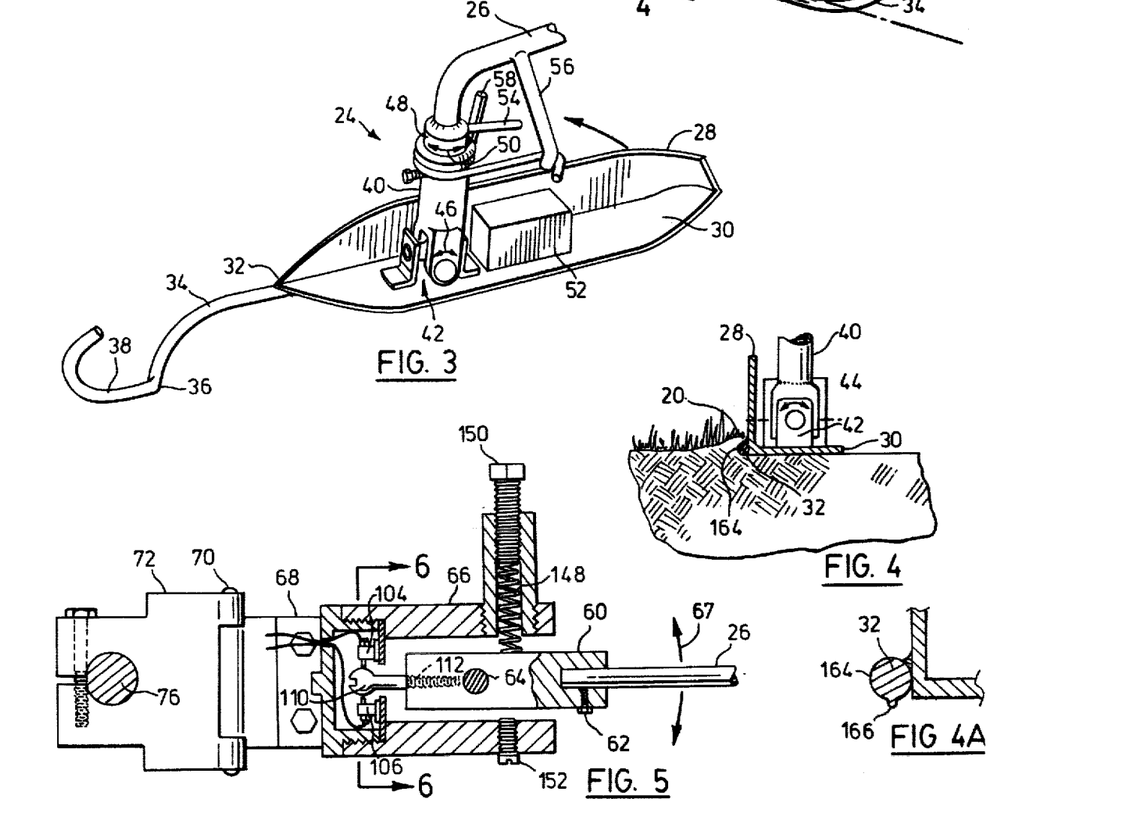
FIG. 3 is a perspective view of the shoe of FIGS. 1 and 2, taken from the outside of the shoe.
FIG. 4 is a sectional view along lines 4—4 of FIG. 2.
FIG. 4a is a sectional view of a modified rod of the shoe previously shown.
FIG. 5 is a sectional view along lines 5—5 of FIG. 2.

The shoe 24 is shown in more detail in FIGS. 2 and 3 and includes a side plate 28 extending vertically along the inward edge of the shoe, and a horizontal bottom plate 30 which joins the side plate 28 at a right angle. A guide rod 32 is welded to the inward side of the side plate 28 and has a forward extension 34 located forwardly of the side plate 28. The forward extension 34 curves outwardly in a horizontal plane to a point indicated at 36, and then extends forwardly and upwardly as shown at 38, so that if the rod 32 encounters obstacles such as small stones, it may ride over these obstacles.

The shoe 24 is mounted on the arm 26 by a post 40 which is connected to the shoe by a universal joint 42. The universal joint 42 permits side to side rolling of the shoe in the direction of arrow 44 (FIG. 4) and front to back pitching of the shoe as indicated by arrow 46 (FIG. 3). The post 40 is also pivotally at 48 connected to the arm 26 to permit side to side yawing of the shoe as indicated by arrow 50. The rear of the shoe is biased downwardly by weight 52, and the rear of the shoe is also biased inwardly against the cut edge of the sod by a coil spring 54. Spring 54 has ends which for this purpose press against extensions 56 and 58 from the arm 26 and post 40 respectively. The bias of the rear of the shoe against the cut edge 20 of the sod reduces the tendency of the front of the shoe to turn against the cut sod edge (which it would otherwise do since the universal joint 42 is spaced outwardly from the cut edge 20) and thereby reduces the tendency of the shoe to turn against and climb over the edge of the sod.

The arm 26 extends rearwardly to an elongated square cross section holder 60 (FIG. 2), to which it is rigidly secured by bolt 62. The holder 60 is pivotally mounted by a vertical shaft 64 (FIG. 5) in a cylindrical hollow socket 66. Shaft 64 permits inward and outward pivotal movement of holder 60, arm 26 and shoe 24 as a unit in a horizontal plane about shaft 64, as indicated by arrow 67, FIG. 5.

The end of the socket 66 is fixed to a plate 68 which is connected, by a hinge 70 oriented in a horizontal plane, to another plate 72. The hinge 70 permits up and down movement of the socket 66, holder 60 and arm 26 in the direction of arrow 74 relative to plate 72.

The plate 72 is fixed to the bottom end of a vertical shaft 76 (FIGS. 2, 5). The shaft 76 is supported, by bearings 78, in a cylindrical housing 80 fixed by a plate 82 (FIG. 2) and bolts 84 to the frame 86 of the sod cutter 14.

As indicated in FIG. 1, the vertical shaft 76 is connected by right angle gears (not shown) contained in housing 88, to a universal joint 90. From universal joint 90 a horizontal square tubing shaft 92 extends toward the tractor 4 and has telescopically fitted therein another horizontal square tubing shaft 94. Shaft 94 is connected to another universal joint 96 which is in turn connected by right angle gears in housing 98 to a vertical shaft 100. The vertical shaft 100 is connected to the steering shaft 102 which turns to steer the front wheels 6 of the tractor. The telescopic connection between shafts 92, 94 permits adjustment in length as the front end of the sod cutter 14 rises and falls relative to the tractor 4.

Sensing of the side to side movement of the shoe 24 is accomplished as follows. As shown in FIGS. 5 and 6, the holder 60 contains two pairs of automobile points 104, 106, which are normally held open but which are moved to closed condition by a biasing spring, not shown. The movable element 104a, 106a of each pair of points has fixed thereto a conventional rubbing block 108 which bears against the rounded end 110 of a bolt 112 threaded into the end of the holder 60. When the arm 26 pivots to one side about the vertical shaft 64, for example clockwise as shown in FIG. 5, this moves bolt end 110 to the left (FIG. 6), opening the left hand points 104 further but permitting the right hand points 106 to close under the pressure of their biasing spring. The inner fixed contacts 104b, 106b of both pairs of points 104, 106, are grounded and when the right hand points 106 close, this sends a ground signal to a solenoid valve in the steering mechanism, as will now be explained with reference to the hydraulic circuit of FIG. 8.

Figure 8:
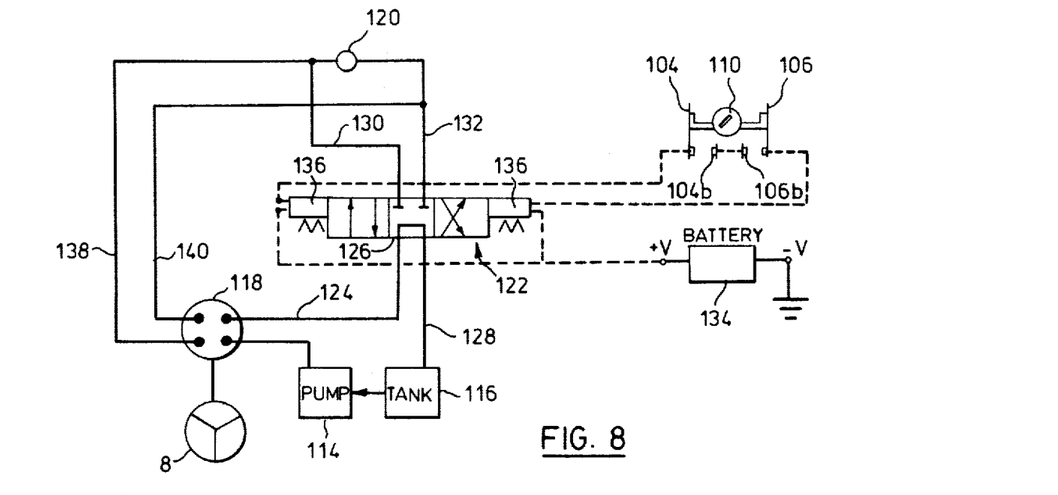
FIG. 8 is a schematic view of a hydraulic-electric circuit for the automatic steering mechanism of the preceding drawings.

As shown in FIG. 8, where dotted lines indicate electric connections and solid lines indicate hydraulic connections, the hydraulic steering circuit for the harvester includes a standard pump 114 which pumps hydraulic fluid from a tank 116 to a conventional power steering valve 118, such as that sold by Char-Lynn under its trade mark "Orbitrol". The power steering valve 118 is controlled by steering wheel 8 to direct hydraulic fluid from the pump 114 to a hydraulic steering motor 120 in the direction required by steering wheel 8, or back to the tank 116 if no steering is called for. The steering motor 120 is connected to steering shaft 102 to steer the tractor.

To effect automatic steering, a four way solenoid valve 122 is inserted into the circuit in parallel with the power steering valve 118. The conduit 124 from the steering unit 118, instead of returning directly to the tank 116 as would occur if valve 122 were not present, is now directed to the center section 126 of four way valve 122 and then via conduit 128 back to the tank 116. Conduits 130, 132 extend from the center section of the four way hydraulic valve 122 to each side of the hydraulic steering motor 120.

As also shown in FIG. 8, power from the tractor battery 134 is connected to solenoids 136 on each side of the solenoid valve 122. In addition the movable contacts 104b, 106b of each pair of points 104, 106 are connected to the other terminals of the solenoids 136.

In operation, and assuming that the automatic steering is not in use, fluid travels from pump 114, through automatic steering valve 118, through either of conduits 138, 140 to hydraulic motor 120 (depending on the steering direction), through the other of conduits 138, 140 back to steering valve 118, and through conduits 124, 128 back to the tank 116.

When automatic steering is required, the steering wheel 8 is left untouched, in a centered position, and the power from battery 134 is switched on to the solenoids 136 (by a switch not shown). Then, if the shoe 24 moves inwardly, i.e. clockwise as drawn in FIG. 5, this permits the right hand points 106 (FIGS. 6 and 8) to close, actuating a solenoid 136 and shifting the spool of valve 122 to the left. Fluid then travels through conduits 124 and 132 to the right hand side of the hydraulic motor 120 and then through conduits 130, 128 back to the tank 116. This causes the hydraulic motor 120 to operate, turning the front wheels 6 to steer the tractor to the right, to follow the curve to the right in the cut sod edge which caused the shoe 24 to move inwardly.

When the front steering wheels 6 of the tractor 4 turn clockwise as seen from above (see also FIG. 7), this rotates the horizontal shafts 92, 94 which in turn rotates the vertical shaft 76 clockwise as seen from above, moving the socket 66 bodily clockwise as seen in FIG. 5. This restores the centered position of the ball end 110 with respect to the points 104, 106, forcing the closed points 106 to open again and cutting off steering power to the hydraulic motor 120. The front steering wheels 6 will then remain in the position to which they were last steered until a further steering signal operates the hydraulic motor 120 to cause the front steering wheels 6 to assume a new position. The system is therefore an on-off system.

To ensure that the shoe 24 will follow the direction of the cut sod edge 20, and also to ensure that movements of socket 66 are transmitted to holder 60, the arm 26 is biased inwardly by a coil spring 148 (FIG. 5) which bears against the holder 60 forwardly of the pivot shaft 64. The compression of the coil spring 148 is adjusted by a bolt 150. Another bolt 152 threaded into socket 66 serves as an adjustable stop on the other side of holder 60. A coil spring 154 (FIG. 1) connected between a rod 156 extending from the side of plate 72 and another projection 158 from the frame 86 serves to take up slack in the mechanical feedback system formed by the square shafts 92, 94 and the universals 90, 96.

To raise the shoe 24 and arm 26 when the sod harvester is traveling forwardly without cutting sod, a chain 160 is provided, connected between arm 26 and a hook 162 located on the housing 80 for shaft 76.

The shape of the shoe 24 will next be discussed. Since the cut edge 20 of a strip of sod can be very thin, for example ⅛ inch or less in height, and is usually of soft material, a severe tendency exists for the shoe to jump or ride over the cut edge 20, which would result in loss of steering control. Therefore as shown in FIG. 4, the shoe 24 is preferably formed with a penetrating edge or protrusion 164 (formed for example by rounded rod 32) on its inward surface which is of lesser height than the thickness of the sod to be cut, so that this edge can penetrate very slightly into the cut edge of the sod below the top surface of the sod. This helps to hold the shoe down, resisting the tendency of the shoe to rise upwardly over the sod. If the sod is ½ inch thick, the rod 32 can typically be ⅛ inch to ¼ inch in diameter in which case the innermost edge of protrusion 164 will be 3/16 to ¼ inch below the top surface of the sod. In addition although the front end of the rod 32 is bent upwardly to ride over obstacles, the upward slope is displaced outwardly of the working edge of the shoe, i.e. outwardly of the portion of the edge which rides against the cut sod edge. This helps to prevent the shoe from rising over the cut sod edge.

Under some said conditions it may also be desirable also to provide a downwardly projecting edge on rod 32, as indicated at 166 in FIG. 4A, to help the shoe track accurately. However the vertical extent of edge 166 will be limited, so as not to interfere unduly with side to side movement of the shoe as it follows the cut sod edge.

The ability of the shoe to move in all directions, i.e. to pitch, roll and yaw, also assists the shoe to follow the contours of the cut edge of the sod.

Figure 9:
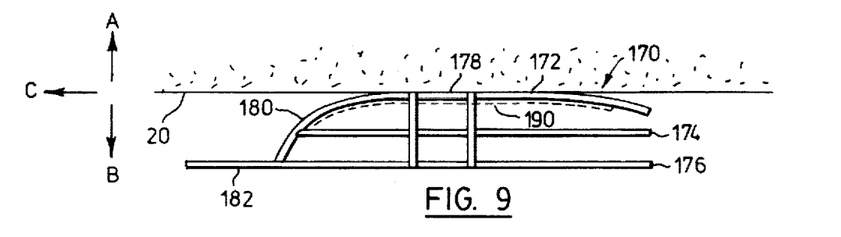
FIG. 9 is a top view of a modified shoe according to the invention.
Figure 10:
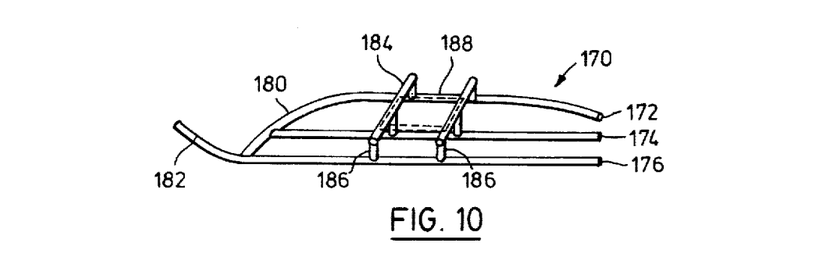
FIG. 10 is a perspective view of the shoe of FIG. 9.

Reference is next made to FIGS. 9 and 10, which show a modified shoe 170 according to the invention. As shown, the shoe 170 is formed from a set of three longitudinally extending rods 172, 174, and 176. Rod 172, which slides past the cut edge of the sod, has a center portion 178 which is slightly curved, i.e. is concave looking in an inward direction, to follow better the contour of the cut edge 20. The forward portion 180 of the inward rod 172 curves forwardly and outwardly, in a horizontal plane, and is joined to the outward rod 176. The forward portion 182 of the outward rod 176 slopes upwardly to ride over obstacles. A bridge 184 extends across all three rods 172, 174, 176 and is supported thereon by short vertically extending rods 186. The bridge 184 carries a plate 188 on which is mounted the universal joint 42 (not shown in FIGS. 9, 10) for the support arm 26. The advantage of the shoe shown in FIGS. 9 and 10 is that it is less likely to pick up and become plugged with loose grass, sticks and other debris than is a shoe having solid plates. However in very soft or muddy sod it may be necessary to add a vertical side plate 190 shown in dotted lines in FIG. 9, similar to side plate 28, along the outward edge of inward rod 172 to prevent this rod from penetrating too deeply into the cut edge 20 of the sod.

Figure 11:
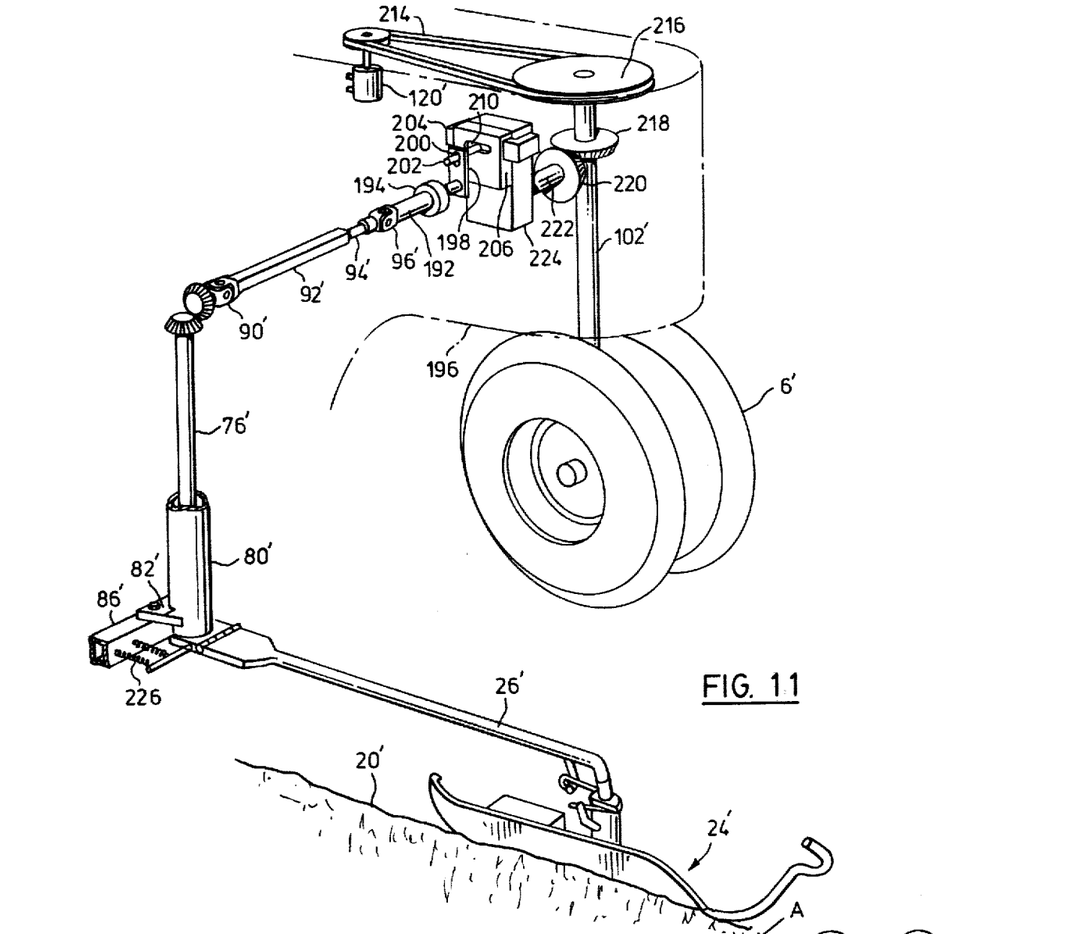
FIG. 11 is a perspective view of a portion of a modified shoe mounting and sensing system according to the invention.
Figure 12:
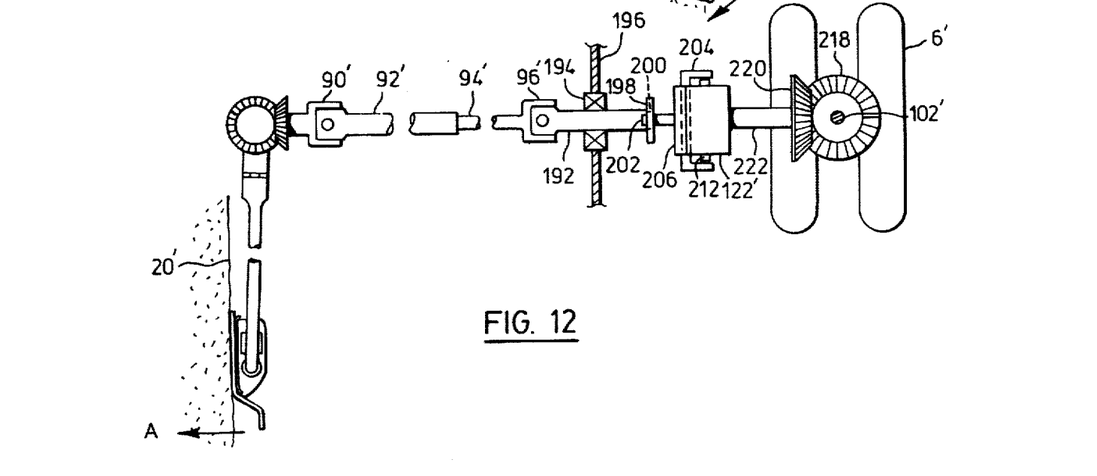
FIG. 12 is a top view of the arrangement of FIG. 11.
Figure 13:
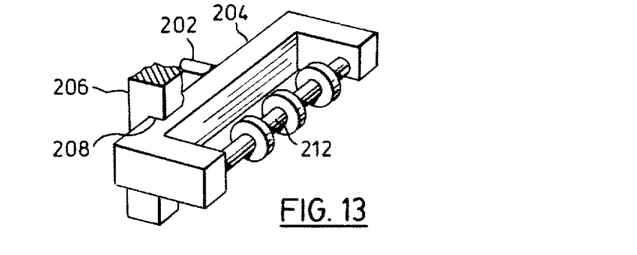
FIG. 13 is a perspective view showing a valve shuttle bracket of FIGS. 11 and 12.

Reference is next made to FIGS. 11 to 13, which show a modified automatic steering mechanism according to the invention, and in which primed reference numerals indicate parts corresponding to those of FIGS. 1 to 10. As shown in FIG. 11, the arm 26, holder 60 and socket 66 have all been consolidated into a single rigid arm 26', so that side to side movement of the shoe 24' is translated directly into rotation of vertical shaft 76'. The vertical shaft 76', as before, transmits its rotary motion through universal 90', shafts 92', 94', and universal 96'.

Figure 14:
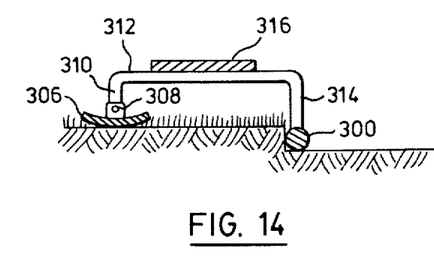
FIG. 14 is a cross sectional view of a modified shoe of the invention.

The universal joint 96' is connected to a shaft 192 which, as shown in FIGS. 11 and 12, is journalled by bearings 194 in a side plate 196 of the tractor 4. Fixed to the other end of shaft 192 is a vertical lever arm 198. The lever arm 198 has a slot 200 in its upper portion. A pin 202 extends through the slot 200 and is fixed to a U-shaped shuttle bracket 204 (FIG. 14). The shuttle bracket 204 is guided for movement forwardly and rearwardly by a guide plate 206 mounted on the four way hydraulic valve 122'. The plate 206 contains a guide groove 208 in its inner surface to retain the shuttle bracket 204 between it and the body of valve 122', and plate 206 also has a slot 210 through which pin 202 projects.

The hydraulic valve 122' is the same as valve 122 of FIG. 8 except that it is now mechanically actuated (by shuttle bracket 204) rather than being electrically actuated. Valve 122' therefore lacks the solenoids 136.

In operation, when the shoe 24' moves from side to side, its movements are transmitted by the shaft 192 to lever arm 198, which moves pin 202 and hence shuttle bracket 204 forwardly and rearwardly. The spool of valve 122' is indicated diagrammatically at 212 in FIG. 14, and as shown, the ends of shuttle bracket 204 engage the ends of spool 212 and move it back and forth to alter the condition of valve 122'. The valve 122' controls the operation of hydraulic steering motor 120' as before.

As shown in FIG. 11, the hydraulic steering motor 120' drives a chain 214 which drives a large steering sprocket 216. The steering sprocket 216 is connected to vertical steering shaft 102' which steers the front wheels 6' of the tractor.

Feedback to shut off the steering motor 120' after sufficient steering has been achieved is provided as follows. A bevel gear 218 is mounted on steering shaft 102' and drives another bevel gear 220 to which is connected a shaft 222. The shaft 222 is mounted in bearings, not shown, and supports at its end a mounting block 224 on which is fixed the four way valve 122'.

In operation, if the shoe 24' moves for example inwardly, this rotates vertical shaft 76' clockwise as shown in FIGS. 11 and 12, rotating shafts 92, 94 and 192 counterclockwise. The top of lever arm 198 moves to the left as shown in FIG. 11. This moves shuttle bracket 204 to the left as shown in FIG. 11 (and to the right as shown in FIG. 13). This moves the valve spool 212 off its center position to operate the hydraulic motor 120'. The hydraulic motor 120' then turns steering sprocket 214 to steer tractor wheels 6' clockwise as seen from above, to follow the cut sod edge 20'.

When wheels 6' and steering shaft 102' turn clockwise, bevel gear 218 also turns clockwise, rotating shaft 222 counterclockwise. This turns the mounting block 224 counterclockwise, carrying the body of four way valve 122' to the left as shown in FIG. 11. The movement of the body of valve 122' in the same direction as the movement of shuttle bracket 204 counteracts the movement of the shuttle bracket and returns the valve 122' to its centered or neutral condition.

It is preferred in the FIGS. 11 to 14 apparatus to use a variable flow valve 122', so that there is a slow flow of hydraulic fluid when the spool is slightly off its center position and a faster flow as it moves farther from its center position. This can be accomplished by tapering the corners of the standard grooves (not shown) in the valve body or by chamfering the edges of the standard discs on the valve spool 212. The automatic steering mechanism is then no longer simply an on-off mechanism but will provide smooth minor corrections when needed and more rapid major corrections if larger steering movements are required. It is found that the FIGS. 11 to 13 steering system is more sensitive and less likely to hunt than the system described previously.

The hydraulic circuit for the automatic steering mechanism in FIGS. 11 to 13 is exactly the same as that shown in FIG. 8, but the electric circuit is eliminated since the signal used to operate the valve 122 is now mechanical instead of electrical.

In addition, since the bias spring 148 of FIG. 5 has been eliminated, coil springs 226 (FIG. 11) are provided, connected between a post 228 extending inwardly from plate 72' and the frame 86', to bias the arm 26' and shoe 24' inwardly against the cut edge 6' of the sod.

It will be appreciated that in the FIG. 1 arrangement, sensing of the position of arm 26 was provided by the points 104, 106 and feedback was provided by a mechanical connection to steer the plate 72 to which the arm 26 was connected. In the FIGS. 11 to 13 embodiment, sensing is provided by a system including the shafts 92', 94' and the sensing system operates a mechanical shuttle to control the steering valve 122'. Feedback is provided by a connection from the steering shaft which moves the valve body itself relative to the steering shuttle.

Although two specific systems have been shown for steering the arm 26 or 26' and for sensing the movement of the shoe, and each has substantial advantages, it will be appreciated that other systems can also be used. For example a "Selsyn" sensing and feedback system may be used if desired.

In addition, although a hydraulic motor has been shown for providing steering power for the vehicle, other hydraulic power means may be used, e.g. a hydraulic piston used with rack and pinion steering. The movement and direction of movement of the piston will then be controlled just as the operation and direction of the hydraulic motor are controlled, by valve means such as that described.

Although the shoe 24, 24' has been described as having its front ramp or upwardly sloping portion 38 displaced outwardly of the sod edge, nevertheless if the cut edge 20 is sharp, clean and well defined, and reasonably high and firm, then the ramp 38 need not in that case be displaced outwardly from the edge. However the outward displacement is preferred.

Figure 15:
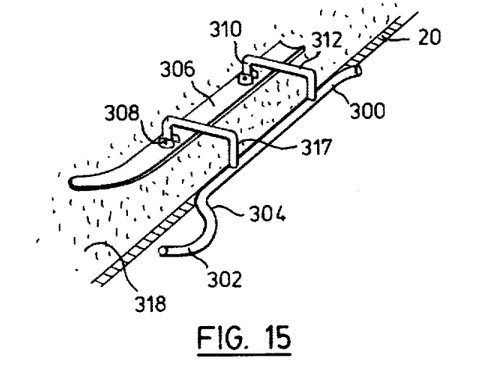
FIG. 15 is a perspective view of the shoe of FIG. 14.

The shoe 24, 24' has also been described as sliding on the earth with its edge against the cut sod edge. However the shoe can also slide over the grass with the edge of the shoe dipping down over the sod edge, as illustrated at 24" in FIGS. 14 and 15. In FIGS. 14 and 15 the shoe 24" has a rod 300 which is the same as rod 32 of FIGS. 2 and 3. Rod 300 has an upwardly sloping ramp 302 which, like ramp 38 of rod 32, is displaced outwardly from sod edge 20. The rod portion 304 connecting ramp 302 and the remainder of rod 300 is horizontal.

The shoe 24" also includes a runner 306 which is concave as viewed from above. Runner 306 is pivotally connected at 308 to short vertical posts 310. Posts 310 are fixed to cross pieces 312. which are fixed to further posts 314 welded to rod 300. The cross pieces 312 carry a plate 316 for the shoe mounting mechanism (not shown).

In use, rod 300 slides along the cut sod edge as before, and runner 306 slides over the grass surface 318. Runner 306 has a front ramp 320 so that it will not act like a plough. If variations in the height of sod edge 20 occur, these are accomodated by rolling of the runner 306 from side to side, as permitted by pivots 308.

Although the automatic steering mechanism and shoe shown have been described for use with a harvester pulled by a tractor, they may also be used in a self propelled sod harvesting vehicle or other type of sod harvester pulled or pushed by a propelling vehicle. In addition they may also be used with a sod laying vehicle, which lays a strip of sod on the ground. In that case, once the first strip has been laid, the shoe will follow the free edge of that strip and guide the machine for laying further strips. The term "sod processing machine" will therefore be used in the appended claims to include both a sod harvesting and a sod laying machine.

Although the housing 80 or 80' and arm 26 or 26' have been shown as mounted on the sod cutter 14, they can of course also be mounted on the tractor 4. In addition, although the valve 122' is shown as connected to the steering wheels and the shuttle bracket 204 to the arm 26', this arrangement can be reversed, i.e. the shuttle bracket 204 can be connected to the steering wheels and the valve 122' to the arm 26'. Further, different linkages can be used; for example the valve 122' can be mounted on a slide and linked by an arm to a steering arm (not shown) of the tractor for simple sliding rather than rotary movement of the valve 122'.

In addition, rolling of the shoe can normally be dispensed with since pitching and yawing movement is commonly sufficient.

What I claim as my invention is:

1. In a harvesting apparatus having steering wheels for steering said apparatus, a steering mechanism for steering said wheels, hydraulic power means for driving said steering mechanism, and a hydraulic steering circuit connected to said hydraulic power means for operating said hydraulic power means, an automatic steering mechanism for guiding said apparatus along a path of travel parallel to a cut edge of sod in the ground, said automatic steering mechanism comprising:

(a) an elongated shoe adapted to slide along the ground against said cut edge and to follow said edge, said shoe having a front ramp means which slopes upwardly and forwardly so that said shoe will rise over obstacles in said path of travel, said shoe further having a trailing end, (b) said shoe comprising an elongated edge rod of substantially circular cross-section adapted to slide along and protrude into said cut edge, a front rod joined to said edge rod and extending outwardly and forwardly in a horizontal plane from said edge rod, away from said cut edge, to a location spaced outwardly of said edge rod, at least one further rod spaced laterally from said edge rod and adapted to slide over the ground and to act as a support runner, said front ramp means extending forwardly from said location and being spaced outwardly from said edge portion, so that said ramp means will not slide along said cut edge, (c) a support arm for said shoe, said support arm having a forward end and a rear end, said rear end being mounted on said apparatus, (d) joint means mounted on said shoe at a location between said front ramp means and said trailing end so that said shoe extends substantially both forwardly and rearwardly of said joint means, said joint means connecting said shoe to said forward end of said support arm for pitching and yawing movement of said shoe relative to said support arm, (e) spring means coupled to said rear end of said support arm and biasing said support arm against said cut edge, (f) sensing and actuating means connected to said arm for sensing side to side movement of said arm as said shoe follows said cut edge and for producing an actuating signal in response to said side to side movement, (g) valve means in said hydraulic steering circuit for controlling flow to said hydraulic power means, (h) said valve means being connected to said sensing and actuating means and being responsive to said actuating signal for operating said power means to steer said steering wheels for said apparatus to follow the path of said shoe, (i) and feedback means connected to said wheels and coupled to one of said sensing and actuating means and said valve means and responsive to the steering of said wheels in the direction caused by said steering signal to change the condition of said one or said sensing and actuating means and said valve means in a direction to reduce the effect of said actuating signal on said valve means.

2. Apparatus according to claim 1 wherein said sensing and actuating means comprises a holder, means supporting said arm for side to side pivotal movement of said arm in said holder, two pairs of automobile ignition points each having an open and a closed condition, one set of pins on each side of said arm in said holder and positioned for movement of said arm in one direction in said holder to change the condition of one set of points and movement of said arm in the other direction in said holder to change the condition of said other set of points, a pair of solenoids connected to said valve for operating said valve, said points being connected to said solenoid means for operation thereof, said feedback means comprising a mechanical connection between said wheels and said holder to steer said holder in the direction of turn of said wheels.

3. Apparatus according to claim 1 wherein said sensing and actuating means includes an actuator connected to said valve means for operating said valve means, means mounting said valve means for movement thereof, and said sensing and actuating means and said feedback means include means coupled between said arm and one of said actuator and said valve means for side to side movement of said arm to move said one of said actuator and said valve means, and means coupled between said steering wheels and the other of said actuator and said valve means for steering movement of said wheels to move the other of said actuator and said valve means.

4. Apparatus according to claim 1 wherein said sensing and actuating means comprises shaft means connected to said arm and rotatable in response to side to side movement of said arm, a shuttle mounted on said valve means for operating said valve means and means connected between said shaft means and said shuttle for moving said shuttle in response to rotary movement of said shaft means, and said feedback means comprises a shaft, means connecting said shaft to said wheels for rotary movement of said shaft with said steering wheels, and means connecting said valve means with said shaft for movement of said valve means with said shaft, so that as said wheels are steered in response to a said actuating signal, said shaft moves said valve means relative to said shuttle in a direction to reduce the effect of said actuating signal.

5. A machine according to claim 1 and including an upright post having a shaft rotatable therein, means connecting said upright arm to said shaft for side to side movement of said arm to rotate said shaft, and means connecting said shaft to said sensing and actuating means.

* * * * *